United States Patent [19]

Verge

[11] 4,357,030
[45] Nov. 2, 1982

[54] SPLASHGUARD FOR VEHICLES

[76] Inventor: Cyril A. Verge, 6519 Roslyn Rd., Halifax, N.S., Canada

[21] Appl. No.: 167,011

[22] Filed: Jul. 9, 1980

[30] Foreign Application Priority Data

Oct. 18, 1979 [CA] Canada .................................. 337878

[51] Int. Cl.³ ............................................ B62D 25/16
[52] U.S. Cl. ............................................ 280/154.5 R
[58] Field of Search ................. 280/154.5 R, 154.5 A; 16/225, 386, 285, 223; 160/231 A, 231 R

[56] References Cited

U.S. PATENT DOCUMENTS

| | | | |
|---|---|---|---|
| 333,408 | 12/1885 | Hale | 280/154.5 R |
| 2,000,220 | 5/1935 | Cohen | 280/154.5 R |
| 2,571,413 | 10/1951 | Botz | 280/154.5 R |
| 2,784,464 | 3/1957 | Larsvall | 160/231 R |
| 2,831,702 | 4/1958 | Eaves et al. | 280/154.5 R |
| 3,088,751 | 5/1963 | Barry et al. | 280/154.5 R |
| 3,799,580 | 3/1974 | McGuire | 280/154.5 R |
| 4,103,918 | 8/1978 | Salden | 280/154.5 R |

FOREIGN PATENT DOCUMENTS 321968 10/1934 Italy .............................. 280/154.5 R Primary Examiner—David M. Mitchell
Attorney, Agent, or Firm—Browdy and Neimark

[57] ABSTRACT

A splashguard for vehicles comprising a top section for securement to the vehicle, a central hinging area, and in preferred construction, a bottom flap section. The hinging area is made up of a number of elongate and parallel hinge members, the top and bottom sections and the intermediate hinge members are secured together by extensible members passing through these components, which enable relative movement between the various components of the device.

9 Claims, 8 Drawing Figures

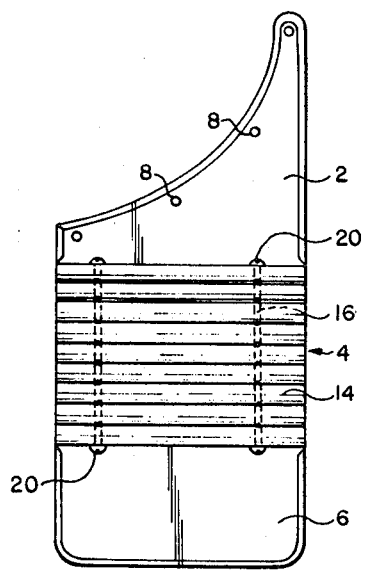
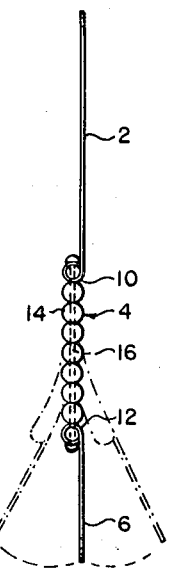
Fig 2   Fig 3
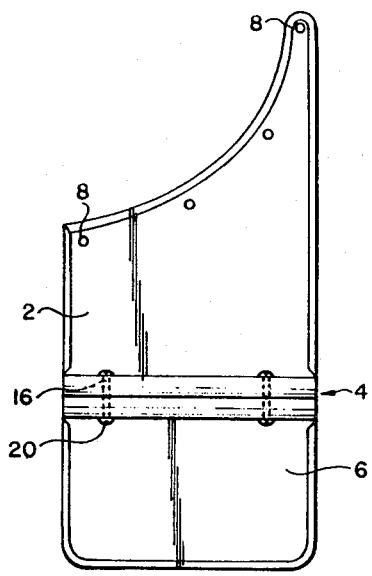
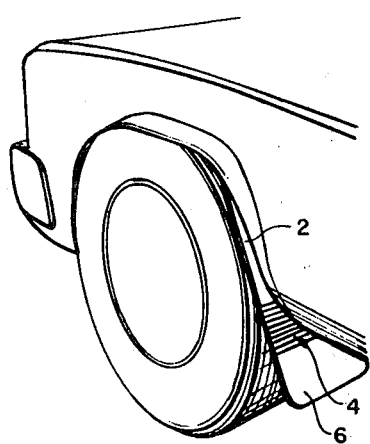
Fig 4   Fig 1

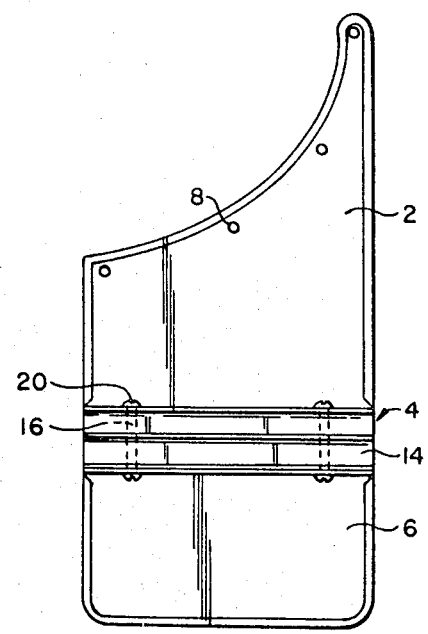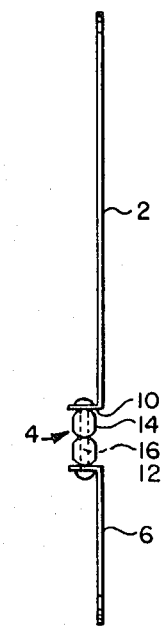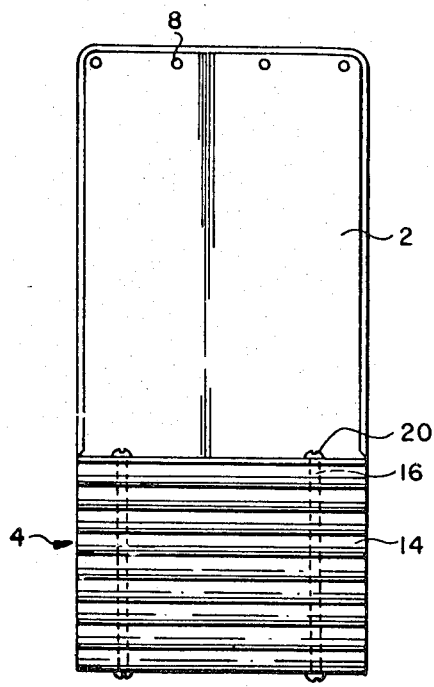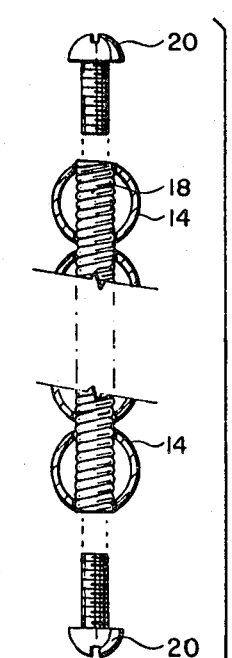

SPLASHGUARD FOR VEHICLES

FIELD OF THE INVENTION

The present invention relates to a mud- and splashguard for motor vehicles which acts to prevent damage to the exterior finish of the vehicle caused by the stones and gravel thrown up by the tires during movement of the vehicle.

The splashguard according to the invention also acts to reduce the incidence of flying stones or gravel caused by rotating vehicle tires and which can result in damage to other vehicles and objects and injury to pedestrians.

DISCUSSION OF PRIOR ART

Various devices of this type are known, and a type commonly available for use on automobiles consists of an upper section which is of stainless steel or other metal construction and which is secured to the vehicle at a position behind the tire, and a lower portion which is made from a material permitting some flexibility such as rubber or plastic, the upper and lower portions usually being secured together by rivets or by other suitable means such as by molding the portions together. Such a device works efficiently for the intended purpose but has the inherent disadvantage of being susceptible to damage as a result of the lower portion being disfigured or actually torn away from the upper portion upon contact with curbs or other obstacles especially when the lower portion material is in a state of deterioration. Moreover, when used in extreme cold, the lower portion loses flexibility and becomes more subject to cracking and breaking as a result of contact with road obstacles.

Other types of splashguards presently in use consist of guards made completely from metal or rubber, and the disadvantage with the units made completely of metal is that they are subject to bend upon contact with curbs and other obstacles encountered during use. This is particularly true when the splashguards fitted on a vehicle are oversize in an effort to provide maximum protection. Splashguargds made completely of rubber or plastic material are more durable although they are not as attractive, but they too are subject to damage and warping which takes away from the overall appearance of the vehicle involved.

The above known types of splashguard devices are all available on the market in what are called standard sizes. Because of the large numbers of sizes and shapes of automobiles available these available "standard" size splashguards are either too big or too small for proper installation. If a splashguard is too small for a particular installation the necessary protection is not provided whereas if the splashguard is too large it becomes subject to increased damage quite apart from being unsightly.

Canadian Pat. No. 694,985 issued Sept. 29, 1964, to Louis A. Barry and Robert P. Considine relating to a Vehicle Tire Spray Shield having an upper member secured to a vehicle and a lower member pivotally carried by the upper member by exterior vertical springs. These springs however are exposed and subject to damage and the exterior positioning of the springs detracts from the appearance of the device.

Other prior patent documentation on pivoting types of gravel- and splashguards are as follows:

| U.S. Pat. 2,141,140 | A. A. Johnson | Dec. 20, 1938 |
| U.S. Pat. 3,095,215 | J. J. Black | June 25, 1963 |
| U.S. Pat. 3,799,580 | P. R. McGuire | March 26, 1974 |
| U.S. Pat. 3,726,544 | J. F. Miller | April 10, 1973 |

The devices of these patents, however, are all primarily directed for use on trucks, and lack appearance for use on modern streamlined automobiles. Additionally, no provisions are made to return the guards to more or less vertical positioning after impact with an obstacle.

OBJECTS OF THE PRESENT INVENTION

The object of the present invention is to provide a splash or mudguard assembly which is so constructed as to permit flexing upon contact with obstacles to minimize any damage to the structure which would impair its effectiveness and overall appearance.

A further object of the invention is to provide a splashguard assembly which is constructed to flex upon contact with obstacles to minimize damage and which may be lengthened or shortened as desired by the addition or removal of hinging component parts for proper installation on a particular vehicle.

More specifically, the present invention relates to a mud- and splashguard for vehicles comprising a top section having provision for securement to a vehicle, the top section having straight lower edge surfaces, and an elongate hinge member in parallel contact with the lower edge surface, and extensible members passing transversely through the elongate hinge member and through the lower edge surface of the top section and holding the elongate hinge member in parallel contacting relationship with the lower edge surface, the extensible means enabling relative movement between the hinge member and the top section.

The invention also relates to a splashguard as above defined, further including a bottom flap section having a straight upper edge surface in parallel contact with a lower surface of an elongate hinge member, the extensible members passing through the upper edge surface of the bottom flap section, the hinge member and the lower edge surface of the top section.

The invention also relates to a splashguard for vehicles comprising a top section having provision for securement to a vehicle and having a straight lower edge surface, and a bottom flap section having a straight upper edge surface, and a plurality of parallel contacting elongate hinge members between the top and bottom sections, and extensible members passing through the hinge members and the said upper and lower edge surfaces, the extensible members enabling relative movement at all points of contact.

In addition, the present invention also relates to a splashguard for vehicles comprising a top section having provision for securement to a vehicle, the top section having a straight lower edge surface, and a bottom flap section having a straight upper edge surface in parallel contact with the straight lower edge surface of the top section, and extensible members extending between and holding the upper and lower sections in parallel contacting but relatively movable relationship.

DESCRIPTION OF ACCOMPANYING DRAWINGS

The invention will now be more fully described with reference to the accompanying drawings wherein:

FIG. 1 illustrates in perspective view a splashguard in accordance with the present invention in position on an automobile behind the front wheel;

FIG. 2 shows one embodiment of the present splashguard;

FIG. 3 is a side view of the splashguard assembly as shown in FIG. 2;

FIG. 4 is a further embodiment of the splashguard of the present invention;

FIG. 5 is a further embodiment of the invention;

FIG. 6 is a side view of the splashguard embodiment as shown in FIG. 5;

FIG. 7 is a further embodiment of the splashguard assembly according to the present invention; and FIG. 8 illustrates suitable means for securing the various components of the assembly together to provide for secure but flexible installation.

Reference will now be had to the accompanying drawings, wherein like reference numbers refer to like parts.

In one embodiment with reference to FIGS. 1 and 2, the present splashguard consists of a top section 2, an intermediate hinging section 4 and a bottom flap section 6.

As shown in FIG. 2, suitable holes 8 may be provided in the top section 2 for securement to a vehicle in conventional fashion, and in a manner as shown in FIG. 1.

As shown in FIGS. 2 and 3, the top section 2 has a straight lower edge surface 10, and the lower flap section 6 has a straight upper edge surface 12, and between these surfaces 10 and 12, a number of individual hinge elements 14 are positioned as shown. In preferred construction, the upper and lower edge surfaces 10 and 12 respectively are of curved or arcuate configuration, and the hinge elements 14 are elongate tubes or rods (which may be hollow or solid); the edge surfaces 10, 12 and the elongate hinge elements 14 all being in parallel and contacting relationship. These components are held in their relative orientation, as shown in FIG. 2, and in full lines in FIG. 3 by extension members 16 which may be in the form of extensible springs or elasticized cord or strip material.

FIG. 8 illustrates a suitable type of extensible members, and it will be seen that the extensible member 16 is in the form of an extensible coiled spring 18 which is received within holes (not numbered) provided in the upper and lower sections 2 and 6 and the hinge members 14. The spring 18 is secured in position by means of suitable bolts 20 whose threads are received between the helical coils of the extensible springs 18 and it will be appreciated by tightening bolts 20 in spring 18 that the various components of the splashguard assembly will result in the assembly as shown in FIG. 2.

In normal use, the splashguard will retain the assembly configuration as shown in FIGS. 1 and 2. However, if the lower section 6 or any portion of the hinging section 4 of the assembly encounters an obstacle, flexing of the splashguard components forwardly or rearwardly is possible due to the nature of the extensible connecting elements 18. FIG. 3 shows in broken lines the flexing of the splashguard a small amount, but it will be appreciated that the assembly is capable of flexing to a much greater degree.

FIG. 4 illustrates a further embodiment of the present invention, and in this arrangement the lower edge surface 10 of the upper section 2 is in direct parallel contact with the upper edge surface 12 of the lower section 6, the two sections being held together by extension members 16 as discussed above.

FIGS. 5 and 6 show a further embodiment where the hinge elements 14 have a somewhat flattened configuration with rounded upper and lower surfaces and wherein the upper and lower edge surfaces 10 and 12 are flat. The operation, however, remains the same and the extensible members are as above discussed.

FIGS. 1, 2, 3, and 5, show the top section 2 having a configuration suitable for securement to the curving surface of an automobile. FIG. 7, however, shows the top section 2 as having a generally rectangular configuration facilitating securement to a truck body or support arm or the like.

In the arrangement shown in FIG. 7, a bottom flap section is not present; the lowermost portion of the splashguard consisting simply of a series of hinge members 14 as shown. The top section 2 as shown in FIG. 7 is shown as being of substantial size. It will be appreciated however that the top section could be of relatively small size providing little more than means for securement to a vehicle with the major portion of the splashguard consisting of a series of hinge members 14 as shown in FIG. 7.

In preferred construction all parallel and contacting surfaces will have oppositely curving circular or arcuate configurations but this is not absolutely necessary for successful operation.

The top and bottom sections 2 and 6 and the hinge elements 14 may conveniently be made of any suitable material such as stainless steel, or other metal material, or rubber and/or plastic compositions. The extensible members 18 may be of stainless steel or other metal composition suitably treated to avoid rusting and corrosion as also will be bolts 20. As indicated above, however, the extensible members could be elasticized cord or strip material secured in position by knotting.

The device of the invention can of course be of any desired size, and can if desired be of a width to extend completely across the back of a vehicle such as a van, camper, truck or trailer behind the rear wheels.

The units of the invention can be made available in varying finished sizes. Alternatively, the units could be made available in ready-to-assemble kit form. Such a kit could for example consist of the components as shown in FIG. 2 with the desired final size of the unit being determined by the number of hinge members used during assembly.

I claim:

1. A mud- and splashguard for vehicles comprising a top section having provision for securement to a vehicle, the top section having a straight lower edge surface,
    and at least one elongate hinge member in parallel contact with the lower edge surface,
    and at least two individual elastically extensible helical springs passing transversely through the elongate hinge member and through the lower edge surface of the top section and holding the elongate hinge member in parallel contacting relationship with the lower edge surface, upper and lower ends of the individual elastically extensible members being independently secured to the top section and to the hinge member respectively, by bolts passing through holes provided therein which are threadedly received within ends of the helical springs, the helical springs enabling relative movement between the hinge member and the top section.

2. A splashguard according to claim 1, wherein the hinge member is in the form of a rod or tube of round or oval cross-section.

3. A splashguard according to claim 1, comprising two or more elongate hinge members all in parallel contacting relationship, the helical springs passing transversely through the hinge members and with lower ends of the helical springs being secured to the lowermost of the hinge members.

4. A splashguard according to claim 1, wherein contacting surfaces of the top section and the hinge member are of curving rounded configuration.

5. A splashguard for vehicles comprising
   a top section having provision for securement to a vehicle and having a straight lower edge surface,
   a bottom flap section having a straight upper edge surface,
   at least one elongate hinge member in parallel contact with and between the upper and lower edge surface,
   and at least two individual elastically extensible helical springs passing transversely through the hinge member and through said upper and lower edge surfaces,
   upper and lower ends of the individual elastically extensible helical springs being independently secured to the top section and to the bottom flap section respectively by bolts passing through holes provided therein and which are threadedly received within ends of the helical springs.

6. A splashguard according to claim 5, having two or more parallel and contacting hinge members positioned between the top section and the bottom flap section.

7. A splashguard according to claim 6, wherein the hinge members are of circular cross-section and the lower and upper edge surfaces are of curving rounded configuration.

8. A vehicle mud- and splashguard assembly kit including
   a top section having provision for securement to a vehicle and having a straight lower edge surface,
   and a bottom flap section having a straight upper edge surface, and at least one elongate hinge member adapted to be positioned in parallel contact with and between the upper and lower edge surface,
   and a pair of elastically extensible helical springs adapted to pass transversely through the elongate hinge section and through the lower edge and upper edge surfaces to hold the elongate hinge member in parallel contacting relationship between the lower edge and the upper edge surface, upper and lower ends of the elastically extensible helical springs being adapted for independent securement to the upper edge surface and to the lower edge surface respectively by bolts passing through holes provided therein which are threadedly received within ends of the helical springs, the helical springs upon assembly of the splashguard enabling relative movement between the top section and the bottom flap section.

9. An assembly kit according to claim 8, further including two or more elongate hinge members, all hinge members being in the form of rods or tubes of oval or round cross-section.

* * * * *